United States Patent
Briscoe et al.

(10) Patent No.: US 6,450,666 B1
(45) Date of Patent: Sep. 17, 2002

(54) KIT FOR FORMING A SUPPORT FOR A STRING OF LIGHTS

(76) Inventors: Paris Briscoe, 1824 N. Jay St., Aberdeen, SD (US) 57401; Stephen Bormes, 324 N. Jay St., Aberdeen, SD (US) 57401

( * ) Notice: Subject to any disclaimer, the term of this patent is extended or adjusted under 35 U.S.C. 154(b) by 0 days.

(21) Appl. No.: 09/947,666

(22) Filed: Sep. 6, 2001

(51) Int. Cl.[7] ............................................... F21S 13/14
(52) U.S. Cl. .................. 362/252; 362/249; 362/391; 362/806; 403/234; 403/329
(58) Field of Search ................. 362/249, 252, 362/396, 391, 405, 806, 809, 807; 403/170, 171, 217, 230, 234, 329

(56) References Cited

U.S. PATENT DOCUMENTS

| | | |
|---|---|---|
| 814,367 A | 3/1906 | Given |
| 1,248,068 A | 11/1917 | Brunel |
| 2,903,820 A | 9/1959 | Bodell |
| 4,274,222 A | 6/1981 | Zahn et al. |
| 4,852,832 A * | 8/1989 | Delaney ..................... 362/249 |
| 5,629,057 A | 5/1997 | Wang et al. |
| 5,645,343 A | 7/1997 | Rinehimer |
| D384,988 S | 10/1997 | Schmidt |
| 5,727,872 A | 3/1998 | Liou |
| 5,876,111 A | 3/1999 | Wu |
| 5,951,147 A * | 9/1999 | Ho .............................. 362/249 |
| 5,956,786 A * | 9/1999 | Huang ........................ 403/329 |
| 5,971,563 A | 10/1999 | Maggio |
| 6,179,442 B1 * | 1/2001 | Schurle ...................... 362/252 |
| 6,179,647 B1 | 1/2001 | Kinderman |

* cited by examiner

Primary Examiner—Stephen Husar

(57) ABSTRACT

A kit for forming a support for strings of lights includes first and second connectors each having a pair of sockets for receiving an end of a support member. The first connector is removably mountable on the second connector by slidably engaging first saddle faces of the first connector with second saddle faces of the second connector, thus positioning support members mounted on the first connector in a plane oriented substantially perpendicular to a plane defined by support members mounted on the second connector. The support member includes an elongate base portion and a plurality of mounting structures mounted thereon. The mounting structures include a pair of mounting members forming a string-receiving channel therebetween. Each mounting member has inner and outer sections. The inner sections may be in a spaced and substantially parallel relationship, and the outer sections diverge from each other for guiding a portion of a light string into the channel.

24 Claims, 13 Drawing Sheets

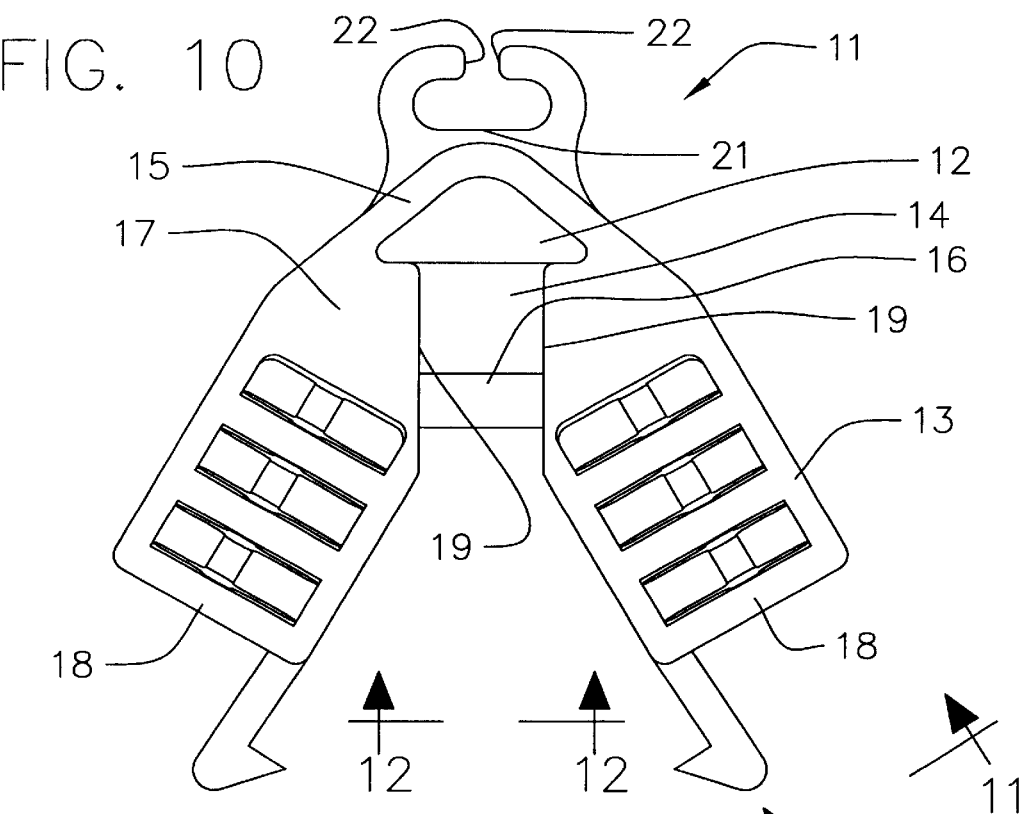
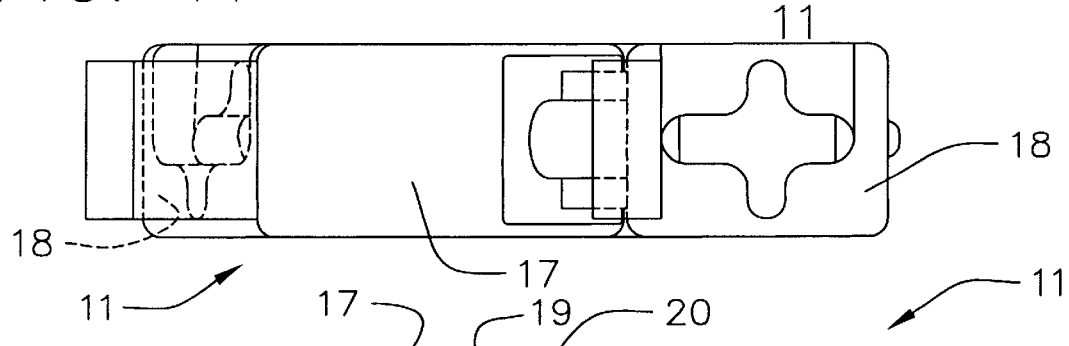
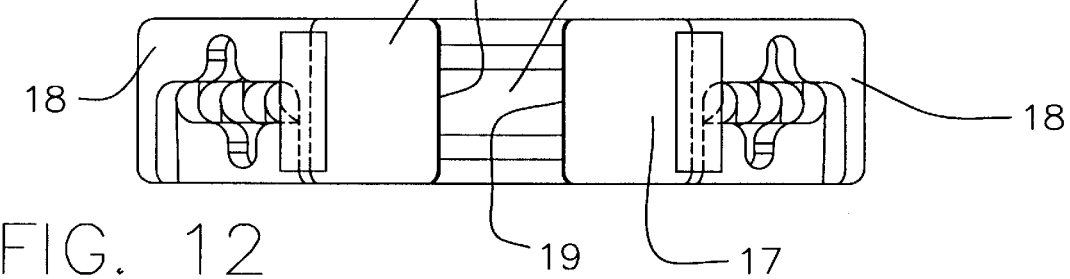

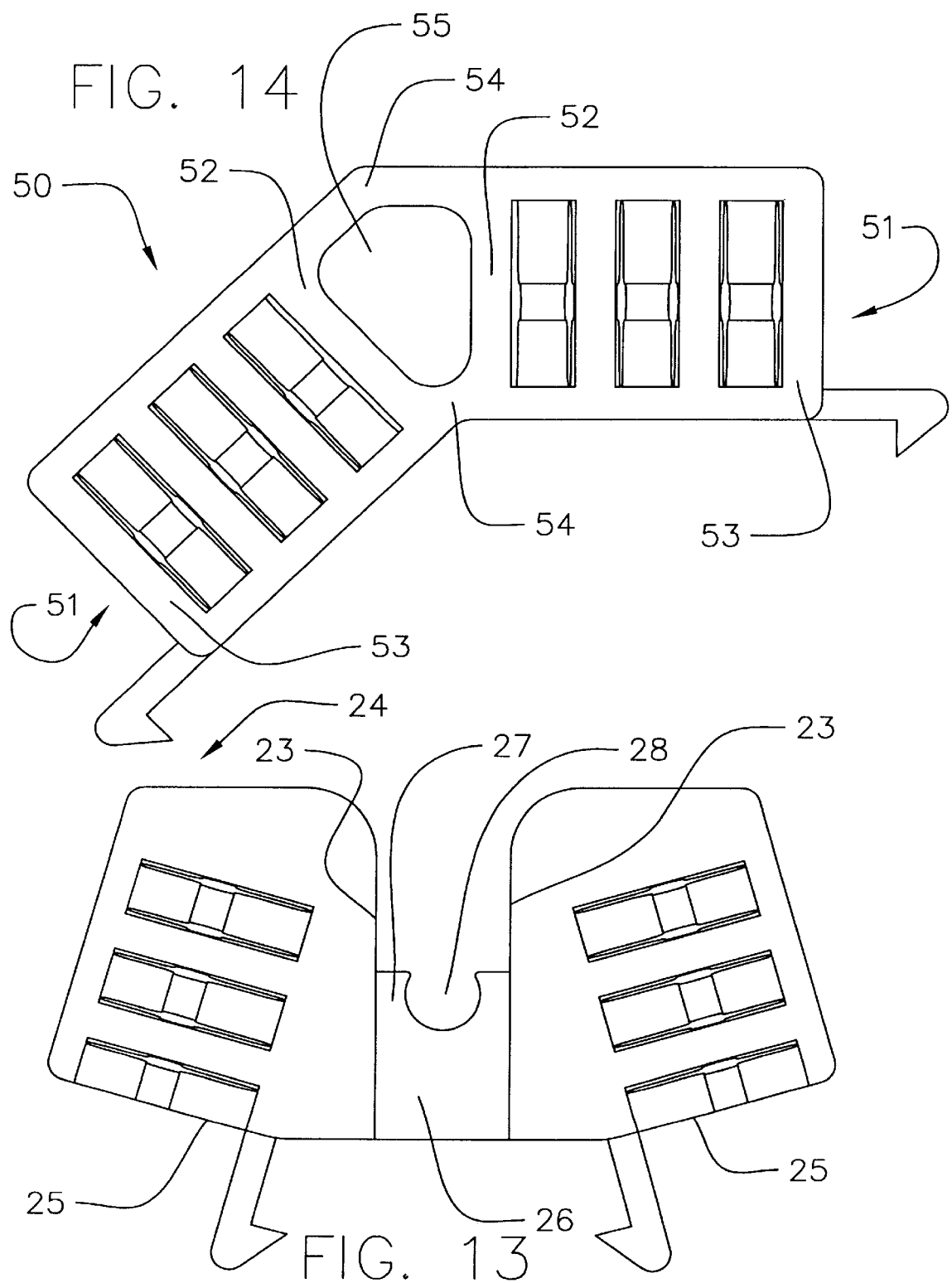

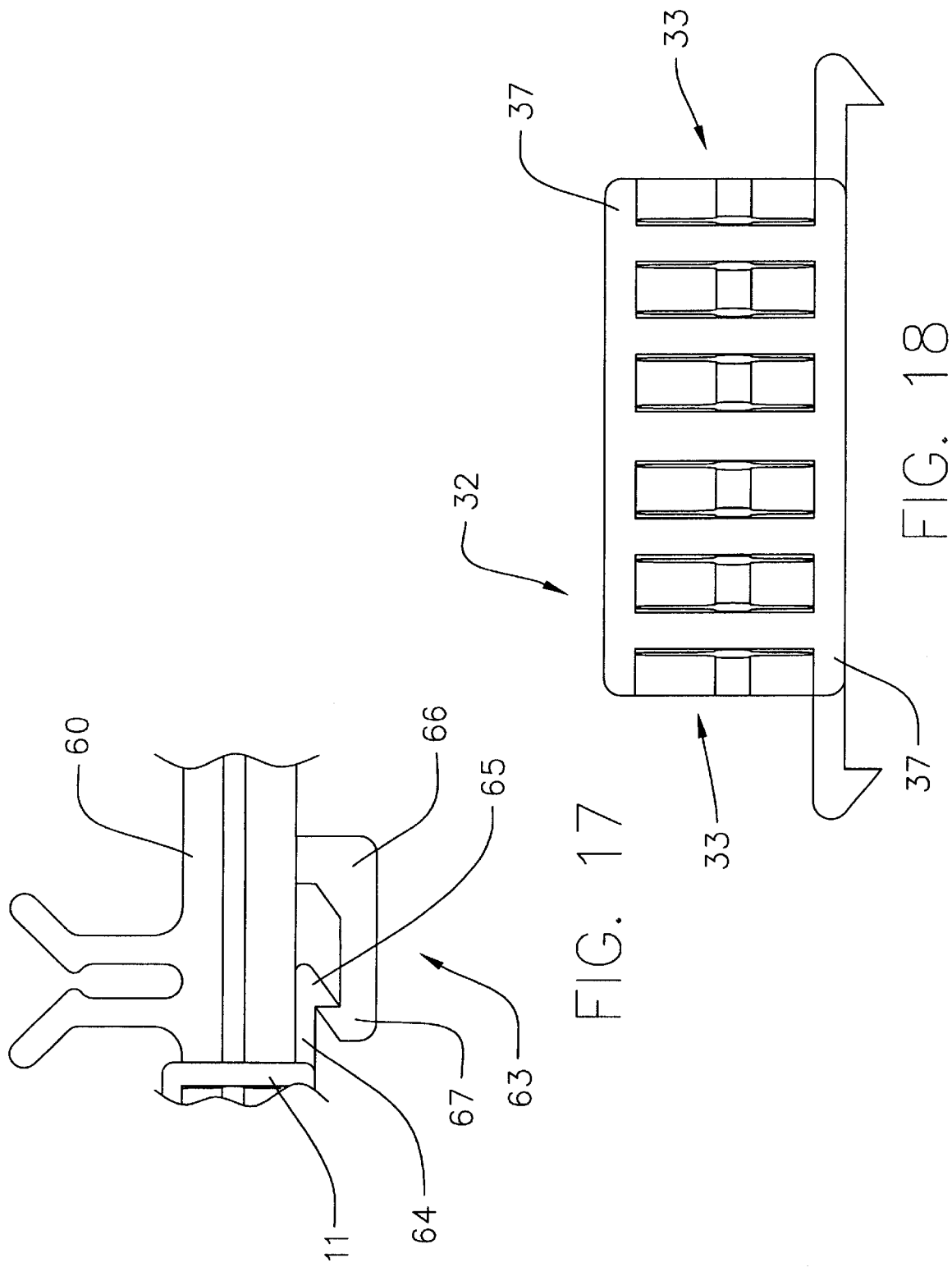

KIT FOR FORMING A SUPPORT FOR A STRING OF LIGHTS

BACKGROUND OF THE INVENTION

1. Field of the Invention

The present invention relates to light string supports and more particularly pertains to a new kit for forming a support for a string of lights for creating a variety of lighted shapes for display.

2. Description of the Prior Art

The use of light string supports is known in the prior art. However, a number of limitations in the usage of these known supports have been identified.

Some known light string supports have the light sockets of the light strings permanently mounted on the support, thus preventing the user from customizing the arrangement or configuration (such as, for example, the spacing) of the lights.

Other known light string support systems require specialized mounts to be formed on the light sockets of the string of lights, and thus cannot use conventional, and relatively inexpensive, light strings that are readily available. One known alternative employs a separate mounting piece to hold the light socket to the support, which permits conventional light strings to be used but also requires the use of additional parts that must be compatible not only with the size and shape of the light socket but also compatible with the size and shape of the support. Thus, quick and easy mounting of conventional light strings on the known supports has been very difficult, if not virtually impossible.

Still other light string supports are constructed with specialized pieces that are usable for only one particular configuration, so that different pieces are needed to alter the shape of the support. This means that one cannot easily change the support from one shape to another shape without purchasing different specialized pieces for the support. Meanwhile, the specialized pieces dedicated to the original shape of the support are not used, and may then be subject to loss or misplacement. Thus, the known supports have employed some specialized parts which are not usable in more than one shape.

Thus, the known light string support systems have lacked the versatility to be used with conventional light strings while also permitting the light string support to be configured in a wide variety of shapes while using only a relatively few elements that may each be used in more than one shape configuration of the support.

SUMMARY OF THE INVENTION

In view of the foregoing disadvantages inherent in the known types of light string supports now present in the prior art, the present invention provides a new kit for forming a support for a string of lights construction wherein the same can be utilized for creating a variety of lighted shapes for display.

The present invention generally comprises a kit for forming a support for strings of lights including a first connector for connecting a pair of support members and a pair of sockets formed on the first connector for each receiving an end of one of the support members. Each of the sockets has a longitudinal axis along which one of the support members is insertable. The first connector includes a central portion and a pair of socket portions.

Each socket portion has one of the sockets formed thereon as well as an inboard end and an outboard end. The inboard end of each of the socket portions is mounted on the central saddle portion. Each socket has an opening located on the outboard end of the respective socket portion. The inboard end of each of the socket portions has a pair of first saddle faces.

The kit may further include a second connector for connecting a pair of support members. A pair of sockets is formed on the second connector, each for receiving an end of one of the support members. Each of the sockets has a longitudinal axis along which one of the support members is insertable. The second connector may include a central portion and a pair of socket portions. Each socket portion has one of the sockets formed thereon as well as an inboard end and an outboard end. The inboard end of each of the socket portions may be mounted on the central saddle portion. Each socket has an opening located on the outboard end of the respective socket portion. The inboard end of each of the socket portions has a pair of second saddle faces.

The first connector is removably mountable on the second connector by slidably engaging the first saddle faces of the first connector with the second saddle faces of the second connector, thus positioning support members mounted on the first connector in a plane oriented perpendicular to a plane defined by support members mounted on the second connector.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 10 is a schematic side view of a first connector of the present invention.

FIG. 11 is a schematic end view of a first connector taken from the perspective of line 11—11 of FIG. 10 of the present invention.

FIG. 12 is a schematic bottom view of a first connector taken from the perspective of line 12—12 of FIG. 10 of the present invention.

FIG. 13 is a schematic side view of a variation of the second connector with a variation in angle measurement.

FIG. 14 is a schematic side view of a fourth connector of the present invention.

FIG. 17 is a schematic side view of broken away portions of a connector and a support member particularly illustrating the structure of the securing assembly.

FIG. 18 is a side view of a variation of the fourth connecting member with a variation in angle measurement.

DESCRIPTION OF THE PREFERRED EMBODIMENT

Figure 1:
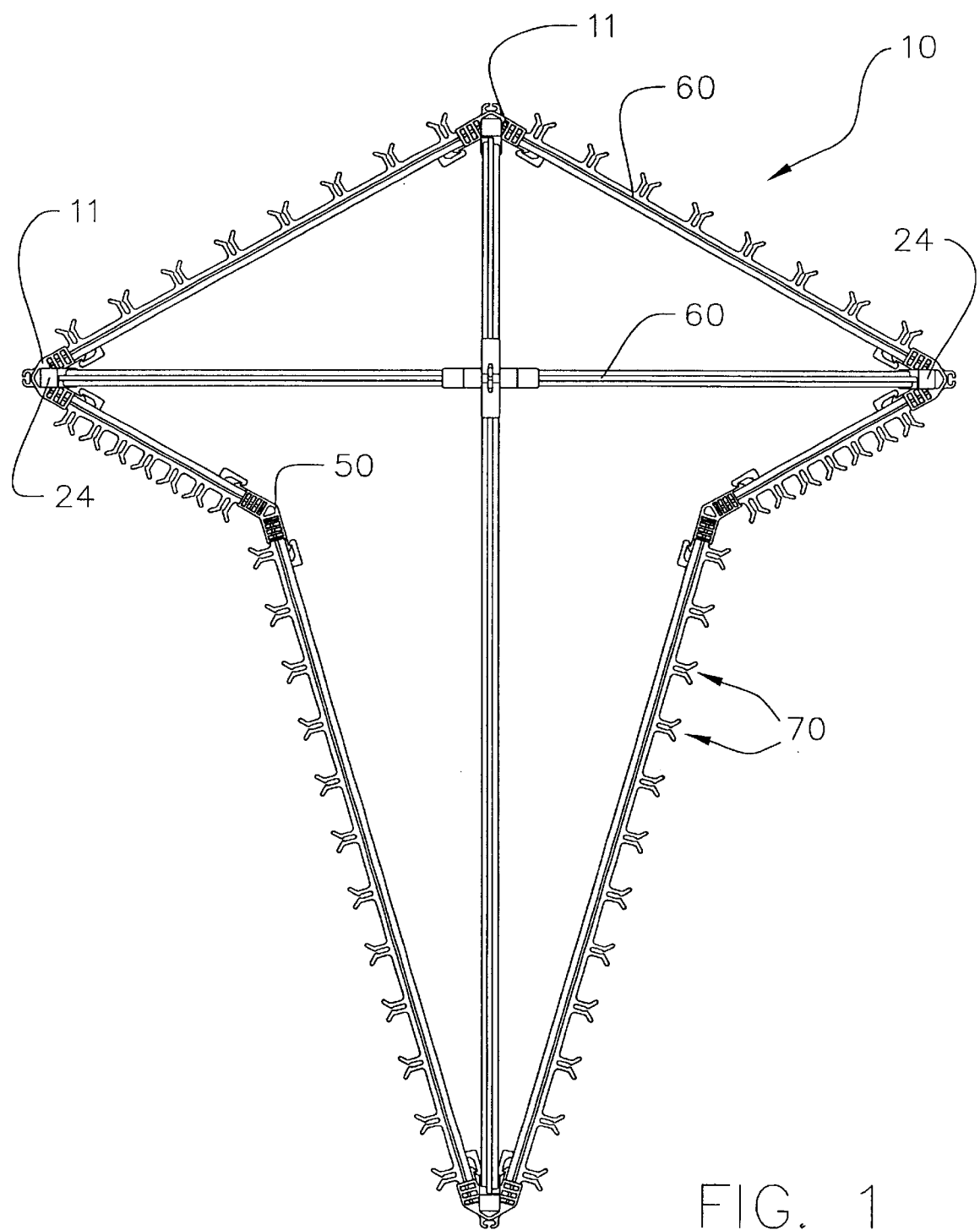
FIG. 1 is a schematic side view of elements of the kit of the present invention assembled into a frame having the general shape of a toy top.

With reference now to the drawings, and in particular to FIGS. 1 through 18 thereof, a new kit for forming a support for a string of lights embodying the principles and concepts of the present invention and generally designated by the reference numeral 10 will be described.

The kit 10 for forming a support for a string of lights generally includes a first connector 11 for connecting a pair of support members 60. A pair of sockets 13 is formed on the first connector 11 so that each socket 13 may receive an end 61 of one of the support members 60. Each of the sockets 13 may have a longitudinal axis along which one of the support members 60 is insertable. The longitudinal axes of the sockets 13 are oriented at an angle with respect to each other. Preferably, the angle measures between approximately 5 degrees and 180 degrees, and most preferably the angle measures between 30 degrees and 120 degrees.

Preferably, the first connector 11 includes a central portion 14. The central portion 14 may include a link section 15 and a saddle section 16. The saddle section 16 may have a part thereof that is formed into a partial cylindrical surface. The link section 15 and the saddle section 16 of the central portion 14 extend between inboard ends 17 of the socket portions 13. Significantly, the link section 15 and the saddle section 16 may define a hanging opening 12 for receiving a hook or cord or wire therethrough to support the first connector and elements of the kit mounted on the first connector.

The first connector 11 may further include a pair of socket portions and preferably, each socket portion has one of the sockets 13 formed thereon. Each of the socket portions has an inboard end 17 and an outboard end 18 and, preferably, the inboard end 17 of each of the socket portions is mounted on the central portion 14. Each socket 13 may also have an opening located on the outboard end 18 of the respective socket portion. Further, the inboard end 17 of each of the socket portions may have a pair of first saddle faces 19. Each of the first saddle faces 19 of the pair may lie in a plane oriented at an angle with respect to each other. An intermediate face 20 may be positioned between the pair of first saddle faces 19.

The first connector 11 may further include a hook portion 21 for hooking or attaching a portion of a light string to the connector. The hook portion 21 is mounted on the central portion 14 and has a pair of opposed hook segments 22. Each of the hook segments 22 has a lateral portion extending from the link section 15 of the central portion 14 and an opposed portion. The lateral portions of the hook segments may be oriented substantially parallel to each other. The opposed portions of the hook segments may be oriented coaxially in an opposed relationship to each other. The ends of the opposed portions may be spaced to form a gap through which a portion of the light string may be passed through. Optionally, the connector may employ a structure similar to the mounting structures of the support members described below for attaching portions of light strings to the connector.

The invention may also include a second connector 24 for connecting a pair of support members 60. Preferably, a pair of sockets 25 is formed on the second connector 24 for each to receive an end 61 of one of the support members 60. Each of the sockets 25 may have a longitudinal axis along which one of the support members 60 is insertable. The longitudinal axes of the sockets 25 are oriented at an angle with respect to each other. Preferably, the angle measures between approximately 5 degrees and 180 degrees, and most preferably the angle measures between 30 degrees and 120 degrees.

In one embodiment of the invention, the second connector 24 may include a central portion 26 that includes a saddle section 27. The saddle section 27 may have a notch 28 for receiving a portion of the saddle section 16 of the central portion 14 of the first connector 11. Illustratively, the notch 28 has a partial substantially cylindrical surface for mating with the partial substantially cylindrical surface of the saddle section of the first connector. Further, the central portion 26 may include a link section 29. Ideally, the link section 29 of the central portion 26 of the second link connector extends between outboard ends of the socket portions of the second link connector.

The second connector may have a pair of socket portions with each socket portion having one of the sockets 25 formed thereon. Each of the socket portions of the second connector may have an inboard end and an outboard end. Further, the inboard end of each of the socket portions may be mounted on the central portion. Each socket has an opening located on the outboard end of the respective socket portion such that the inboard end of each of the socket portions has a pair of second saddle faces 23. Preferably, each of the second saddle faces of the pair lie in a plane oriented at an angle with respect to each other. An intermediate face may be positioned between the pair of second saddle faces for positioning adjacent to the inboard end of one of the socket portions of the first connector when the first and second connectors are mounted together. The first connector 11 is removably mountable on the second connector 24 by slidably engaging the first saddle faces 19 of the first connector 11 with the second saddle faces 23 of the second connector 24 for positioning support members 60 mounted on the first connector 11 in a plane oriented perpendicular to a plane defined by support members 60 mounted on the second connector 24.

The invention may further include a third connector 40 for connecting to a support member 60. A socket 41 is formed on the third connector 40 for receiving an end of one of the support members 60. The socket 41 may have a longitudinal axis along which one of the support members 60 is insertable. The third connector 40 may include a socket portion having the socket 41 formed thereon. The socket portion has an inboard end 42 and an outboard end 43. The socket 41 has an opening 44 located on the outboard end 43 of the socket portion. Significantly, the third connector may include a saddle section 48 that is similar to the saddle section 16 of the first connector 11 so that the saddle section 48 may be removably inserted into, for example, the notch 28 of the second connector. In one embodiment of the third connector, an axis of the saddle section 48 extends substantially parallel to a longitudinal axis of the socket 41 so that a longitudinal axis of a support member inserted into the socket extends substantially perpendicular to a plane of support members connected to a connector that is connected to the saddle section of the third connector.

The third connector 40 may further include a hook portion 45 for hooking or attaching a portion of a light string to the third connector, and in one preferred embodiment a pair of the hook portions are located on the third connector. The hook portion 45 may be mounted on the socket portion of the third connector. The hook portion 45 has a pair of opposed hook segments 46 and each of the hook segments has a lateral portion 47 extending from the link section of the central portion and an opposed portion 46. The lateral portions 47 of the hook segments may be oriented substantially parallel to each other. Preferably, the opposed portions 46 of the hook segments are oriented substantially coaxially in an opposed relationship to each other such that the third connector 40 includes a pair of the hook portions 45. Each of the hook portions 45 is mounted intermediate to the inboard 42 and outboard 43 ends of the socket portion. Each of the hook portions 45 is mounted on an outer side surface of one of the socket portions. A loop portion 49 may be mounted adjacent to the inboard end 42 of the socket portion for receiving a hook or cord for suspending the connector and support members connected to the connector. Ideally, the loop portion 49 is mounted at an apex of the connector portions.

The invention may further include a fourth connector 50 for connecting a pair of support members 60. A pair of sockets 51 may be formed on the fourth connector 50 for each receiving an end of one of the support members 60. Each of the sockets 51 may have a longitudinal axis along which one of the support members 60 is insertable. The longitudinal axes of the sockets may be oriented at an angle with respect to each other. Preferably, the angle measures between approximately 5 degrees and 180 degrees, and most preferably the angle measures between 30 degrees and 120 degrees.

The fourth connector 50 preferably includes a pair of socket portions. Each socket portion has one of the sockets 51 formed thereon and includes an inboard end 52 and an outboard end 53. Each socket 51 has an opening located on the outboard end 53 of the respective socket portion. A pair of links 54 may link the inboard ends 52 of the socket portions. A space between the pair of links 54 may form a hanging opening 55 for receiving a hook or cord therethrough to support the fourth connector and elements of the kit mounted on the fourth connector.

The invention further includes a support member 60 for supporting a length of a string of lights. The support member 60 includes an elongate base portion 62 having opposite ends 61. A plurality of mounting structures 70 or light string holders may be mounted on the base portion 62. Preferably, the support member 60 may be of different lengths, ranging from approximately 8 inches to approximately 30 inches, and lengths up to 60 inches or more may be suitable.

A securing assembly 63 may be provided for securing the support member to one of the connectors in a manner that holds the support member in the socket of the connector, but permits the support member to be withdrawn from the socket by a user when desired. The securing assembly 63 may include a first component mounted on the connector and a second component mounted on the support member which releasably engage each other when the support member is sufficiently inserted into a socket of the connector. The first component may comprise a first securing arm 64 with a first securing barb 65 and the second component may comprise a second securing arm 66 with a second securing barb 67. The first securing barb 65 is mounted on the connector and the second securing barb 67 is mounted on the support member in a manner such that the first securing barb engages the second securing barb when the support member is inserted in the socket of the connector and resists removal of the support member from the socket from the connector unless, for example, the user moves the second securing arm away from the first securing arm. The resilient flexibility of the material forming the support member preferably permits the second securing arm to be deflected away from the first securing arm to release the barbs from each other.

In one embodiment of the invention, each of the mounting structures 70 may include a pair of mounting members 71 forming a string-receiving channel 72 therebetween. Each of the mounting members 71 may include an inner section 73 and an outer section 74 such that the outer section 74 is mounted on the inner section 73. Preferably, the inner sections 73 of the pair of mounting members 71 are in a spaced and substantially parallel relationship. Further, the outer sections 74 of the pair of mounting members 71 may diverge away from each other. Significantly, the divergence of the outer sections helps to guide a portion of the light string into the string-receiving channel 72 during installation of the light string on the support member, such that the user does not have to be precise in aiming or centering the portion of the light string with respect to the mounting members in order to move the light string into the channel 72. Preferably, adjacent pairs of mounting members may be spaced apart a distance of approximately 1 to 2 inches, although narrower and wider spacings may be used. The spacing of the mounting members may be dependent upon the length of the support member; thus, a longer length of support member may have a greater distance between mounting members and vice versa.

The support member 60 may further include a retaining heel 75 mounted on each of the mounting members 71 at a juncture of the inner 73 and outer 74 sections. The retaining heels 75 of the mounting members 71 of the pair of mounting members 71 are ideally opposed to each other for resisting movement of a portion of a string of lights out of the string-receiving channel 72. The retaining heels may be moved away from each other by applying a degree of force to the mounting members to move a portion of the light string therebetween, and the preferred resiliency of the mounting members may move the retaining heels back toward each other after the light string has moved by the retaining heels.

In one embodiment of the invention, all of the plurality of mounting structures 70 extend in a same direction from the base portion 62. Further, all of the plurality of mounting structures 70 may lie in a common plane. Also, the mounting structures 70 may be substantially uniformly spaced along a length of the support member 60. Also, the base portion 62 may have a cross-shaped transverse cross section with four lobes. The mounting members 71 may extend from one of the lobes. One lobe of the base portion may extend further from a center of the base portion than the other lobes to require that the support members be inserted into the sockets of the connectors in only one orientation. Illustratively, in one embodiment of the invention, the lobe located opposite of the lobe on which the mounting structures are mounted may be made larger than the other lobes, and the sockets of the connectors may be configured so that the support member may only be inserted into the socket when the mounting structures of the support member oriented in an outward direction from, for example, an interior of a shape to be created by the components of the kit.

In greater detail, each of the socket portions of the connectors may have a plurality of socket-defining walls. Each of the socket-defining walls may also have a contoured edge defining a portion of the socket 13, 25, 33, 41, and 51 in the socket portion. Ideally, a first quantity of the plurality of socket-defining walls is positioned at a first lateral side of the socket and a second quantity of the plurality of socket-defining walls is positioned at a second lateral side of the socket 13, 25, 33, 41 and 51. Preferably, the socket-defining walls of the first quantity of socket-defining walls are longitudinally offset from the socket-defining walls of the second quantity of socket-defining walls such that the walls of the first and second quantities alternate in a longitudinal direction of the socket.

Figure 2:
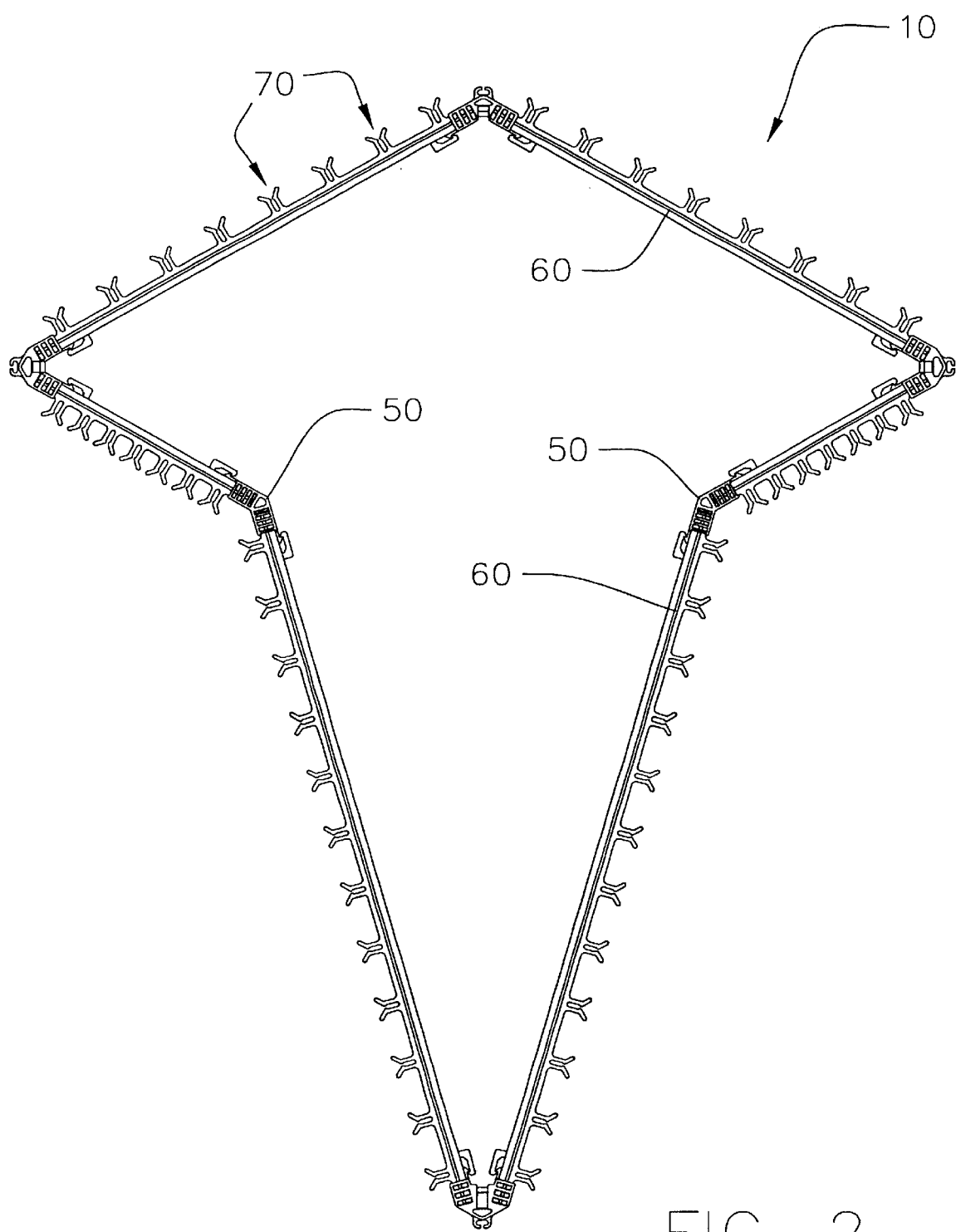
FIG. 2 is a schematic side view of one planar section of the frame shown in FIG. 1.
Figure 3:
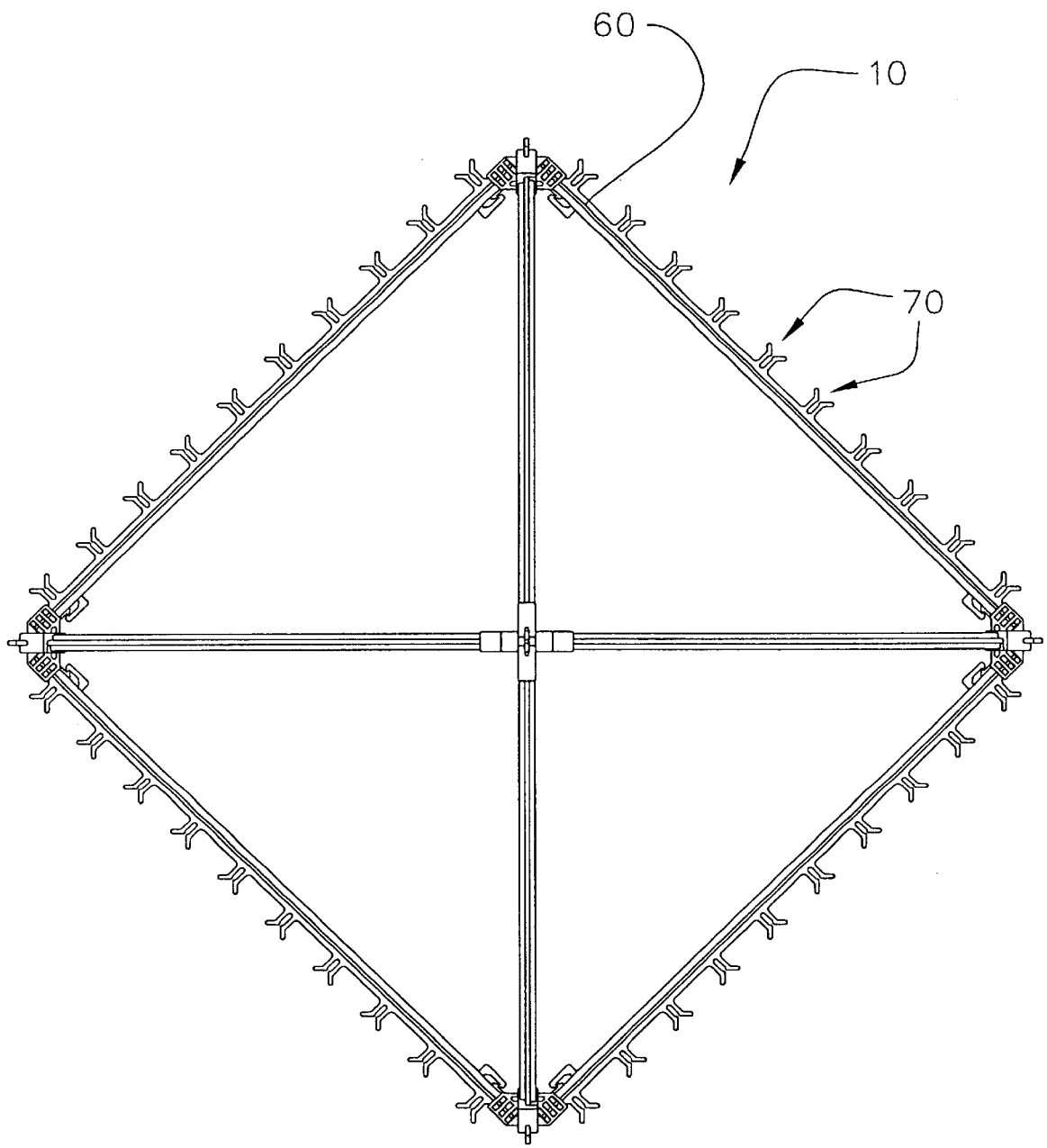
FIG. 3 is a schematic side view of elements of the kit of the present invention assembled into a frame having the general shape of a diamond.
Figure 4:
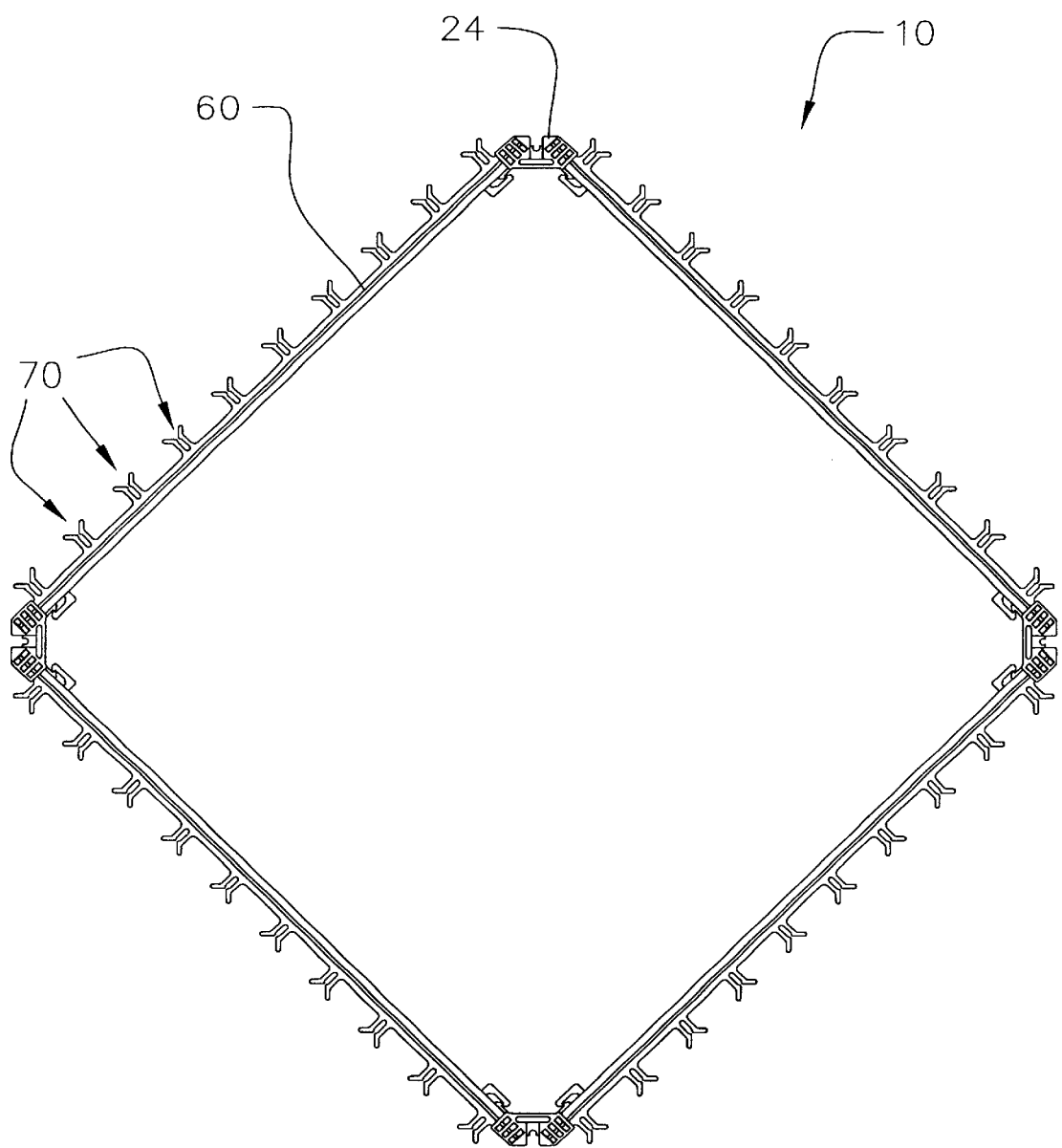
FIG. 4 is a schematic side view of one planar section of the frame shown in FIG. 3.
Figure 5:
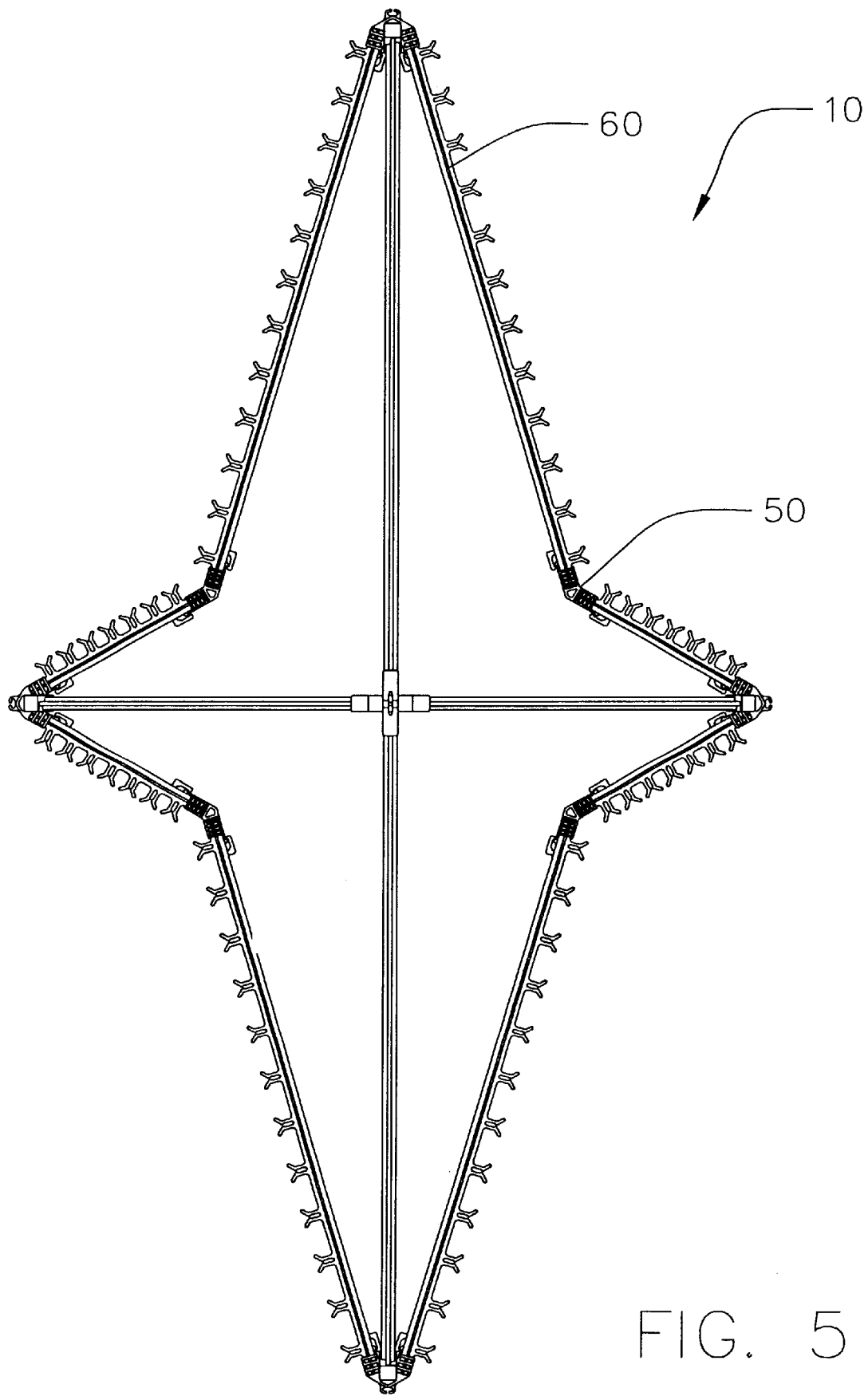
FIG. 5 is a schematic side view of elements of the kit of the present invention assembled into a frame having the general shape of a star.
Figure 6:
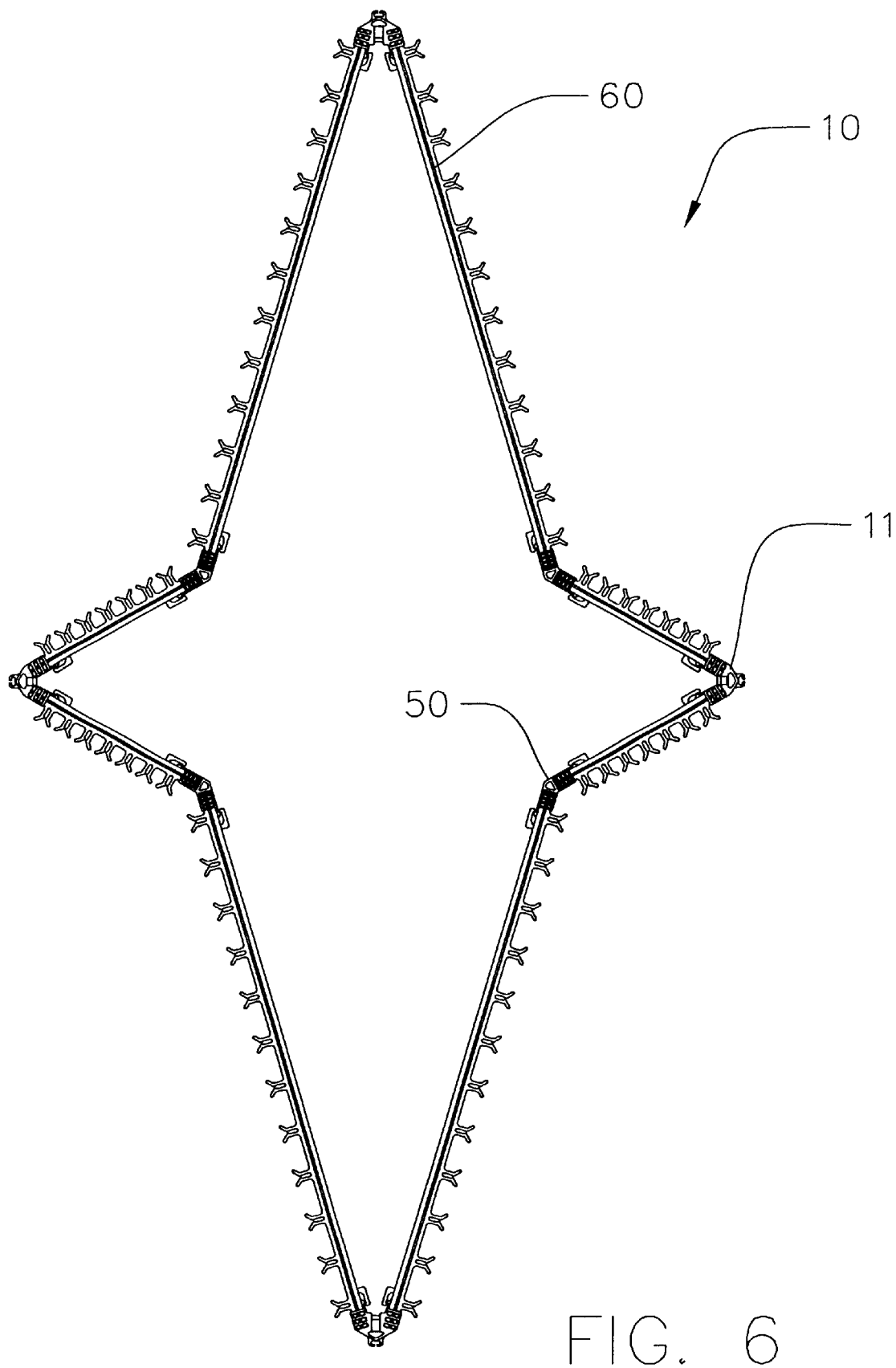
FIG. 6 is a schematic side view of one planar section of the frame shown in FIG. 5.
Figure 7:
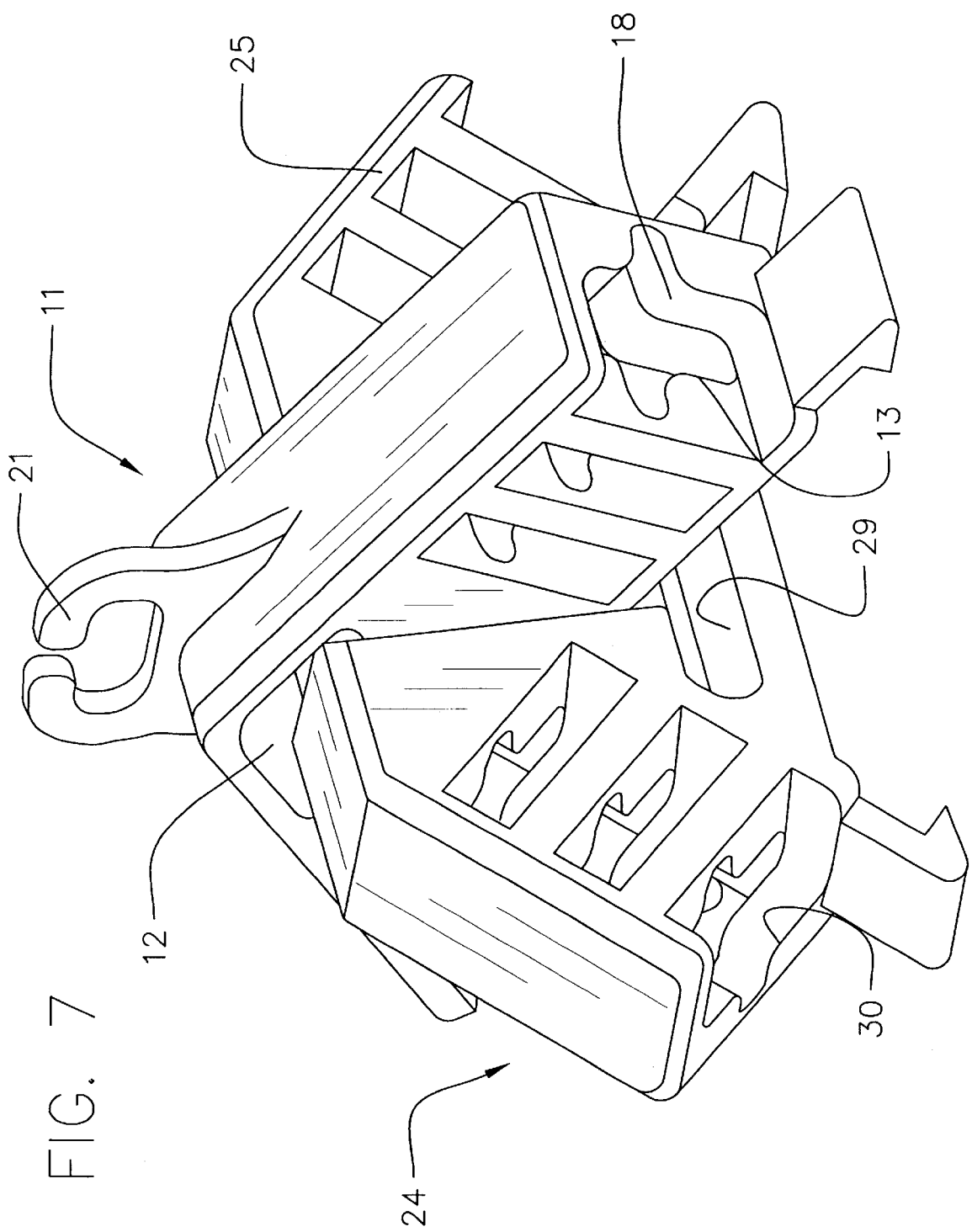
FIG. 7 is a schematic perspective view of first and second connectors of the present invention shown in a connected condition.
Figure 8:
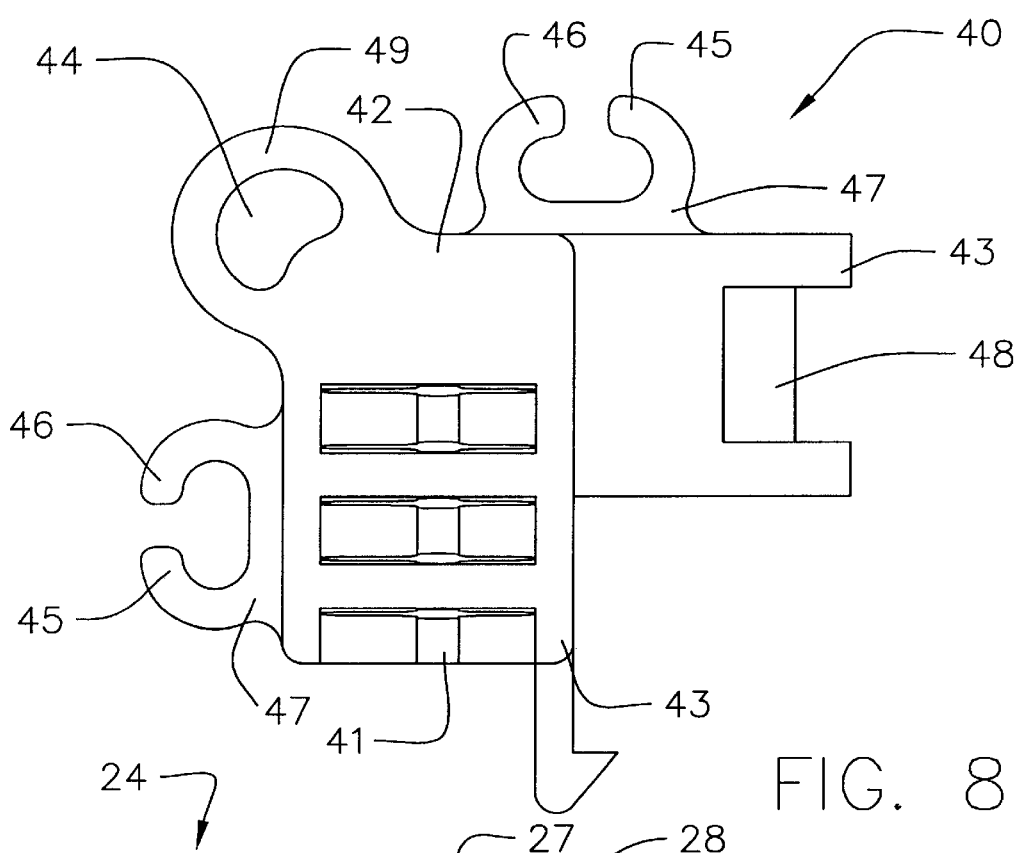
FIG. 8 is a schematic side view of a third connector of the present invention.
Figure 9:
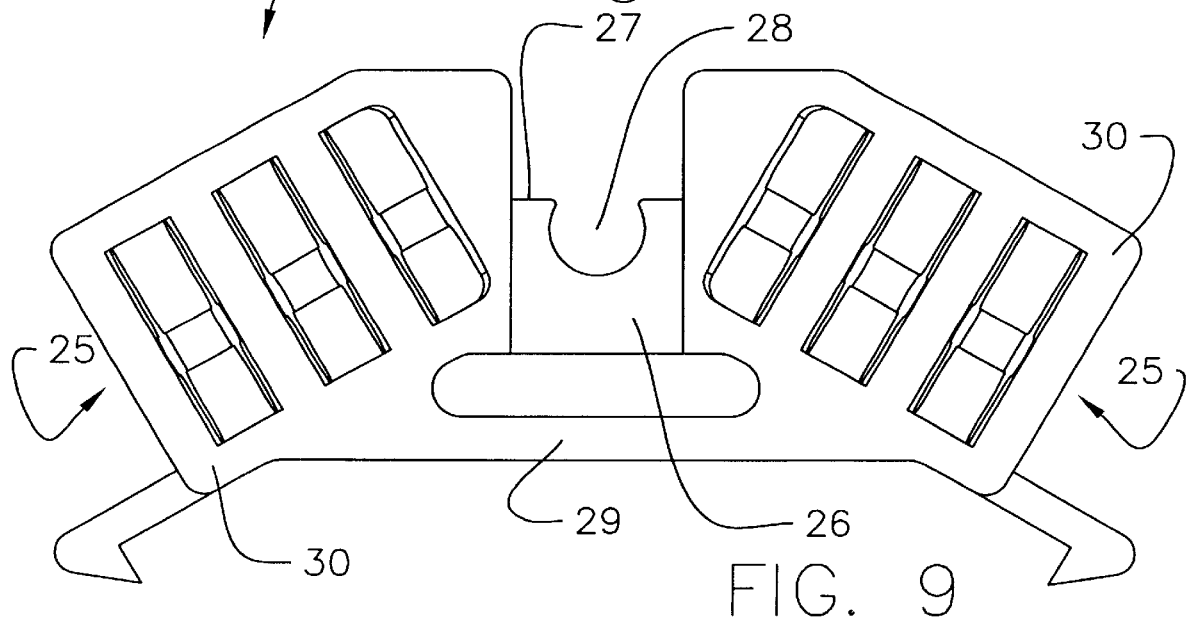
FIG. 9 is a schematic side view of a second connector of the present invention.
Figure 15:
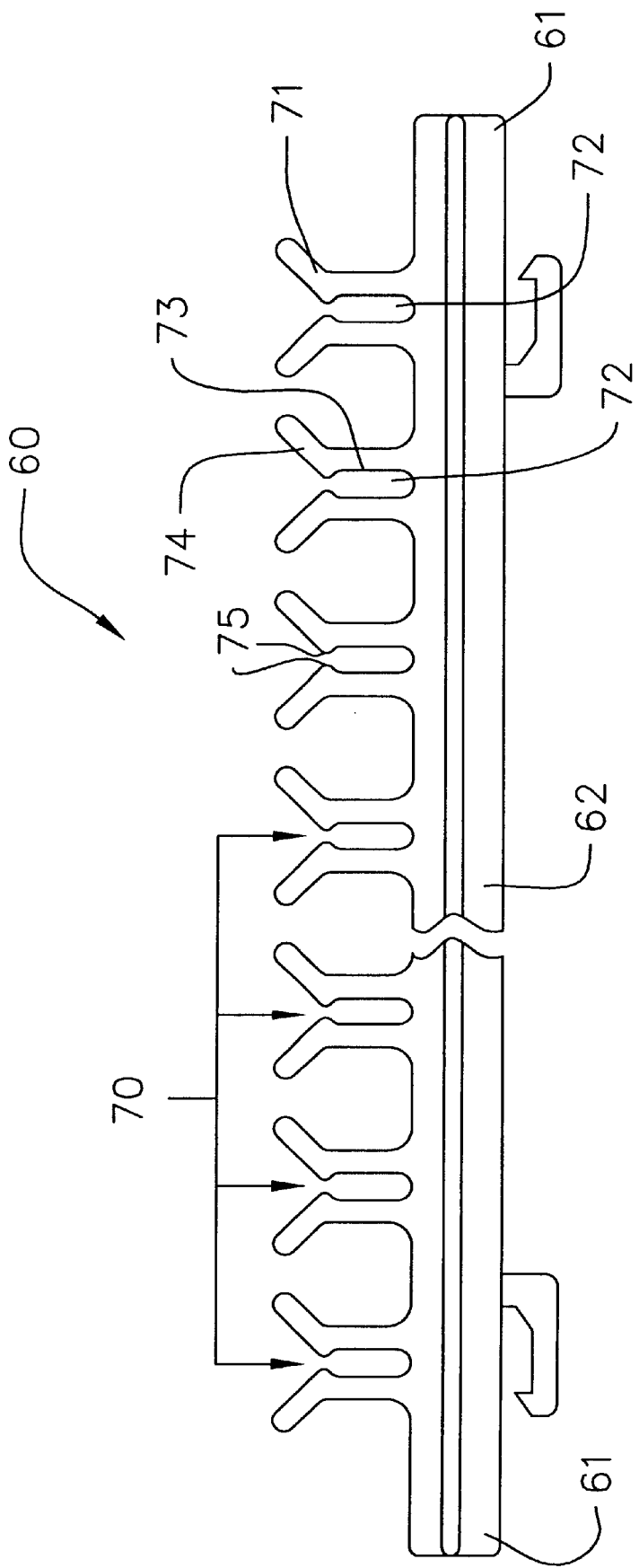
FIG. 15 is a schematic side view of a support member of the present invention.
Figure 16:
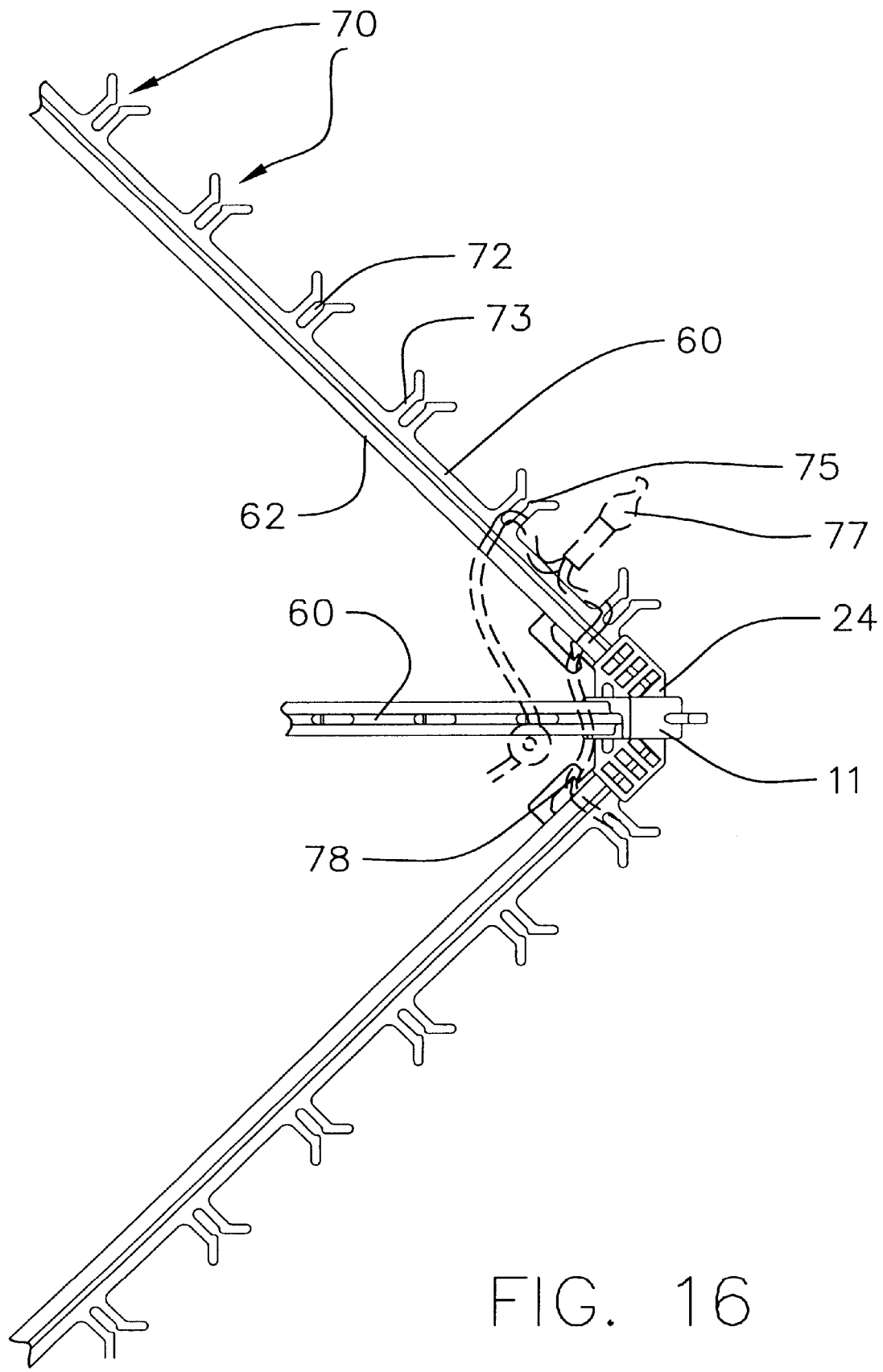
FIG. 16 is a schematic side view of assembled support members and connecting members and particularly illustrating a light string positioned on the mounting structures of the support members.

Preferably, the parts of the kits are formed from a polymerized material to allow uniform molding in manufacturing. Ideally, the kit can be put together to form a plurality of different shapes, or different kits may each be constructed for different shapes. Preferably, the shapes of the supports comprise a plurality of different shapes, including shapes resembling toy tops, diamonds, or cut gems, as shown in FIGS. 1 through 7. The toy top shape ideally has a smaller first end section, an elongated middle section and a ballooned second end section, as shown in FIGS. 1 and 2. One of the gem shapes preferably comprises a plurality of faceted or diamond shaped supports intertwined with each other. Another preferred shape may have an elongated diamond shape intertwined with a smaller diamond shape resembling a holiday ornament that is hung on a tree.

In use, the kit is placed together by connecting the connecting members with the support members in a variety of shapes. The support members are inserted into the socket portions of the connecting members. The display lights are then mounted on the support members and connectors, such as by wrapping the light string about the support members and connectors or by stringing the light string along the length of the support members and connectors. Portions of the light string are positioned or lodged between the mounting members, such as the wires of the light string or even the socket of the light string. The structure is then removably attached to a display unit, such as a large tree, and the structure then resembles an ornament hanging on a tree.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A kit for forming a support for strings of lights, comprising:

a first connector for connecting a pair of support members, a pair of sockets being formed on the first connector for each receiving an end of one of the support members, the first connector comprising a central portion and a pair of socket portions, each socket portion having one of the sockets formed thereon, each of the socket portions having an inboard end and an outboard end, the inboard end of each of the socket portions being mounted on the central saddle portion, each socket having an opening located on the outboard end of the respective socket portion, wherein the inboard end of each of the socket portions has a pair of first saddle faces;

a second connector for connecting a pair of support members, a pair of sockets being formed on the second connector for each receiving an end of one of the support members, the second connector comprising a central portion and a pair of socket portions, each socket portion having one of the sockets formed thereon, each of the socket portions having an inboard end and an outboard end, the inboard end of each of the socket portions being mounted on the central saddle portion, each socket having an opening located on the outboard end of the respective socket portion, wherein the inboard end of each of the socket portions has a pair of second saddle faces;

wherein the first connector is removably mountable on the second connector by slidably engaging the first saddle faces of the first connector with the second saddle faces of the second connector for positioning support members mounted on the first connector in a plane oriented substantially perpendicular to a plane defined by support members mounted on the second connector.

2. The kit of claim 1 additionally comprising a pair of support members for supporting a length of a string of lights.

3. The kit of claim 2 wherein each of the support members comprises:

an elongate base portion having opposite ends; and a plurality of mounting structures mounted on the base portion, each of the mounting structures comprising a pair of mounting members forming a string-receiving channel therebetween.

4. The kit of claim 3 wherein each of the mounting members has an inner section and an outer section, the outer section being mounted on the inner section, the inner sections of the pair of mounting members being in a spaced and substantially parallel relationship, the outer sections of the pair of mounting members diverging away from each other.

5. The kit of claim 4 wherein a retaining heel is mounted on each of the mounting members at a juncture of the inner and outer sections, the retaining heels of the mounting members of the pair of mounting members being opposed to each other for resisting movement of a portion of a string of lights from the string-receiving channel.

6. The kit of claim 3 wherein the base portion of the support members has a cross-shaped transverse cross section and each of the sockets of the connectors has a cross-shaped channel for receiving an end of one of the support members.

7. The kit of claim 1 wherein each first saddle face of the pair of first saddle faces lies in a plane oriented at an angle with respect to each other, and each second saddle face of the pair of second saddle faces lies in a plane oriented at an angle with respect to each other.

8. The kit of claim 1 additionally comprising a third connector for connecting to a support member, a socket being formed on the third connector for receiving an end of the support member, the socket of the third connector having a longitudinal axis along which one of the support members is insertable.

9. The kit of claim 8 wherein the third connector comprises:
    a socket portion having a socket formed thereon, the socket portion having an inboard end and an outboard end, the socket having an opening located on the outboard end of the socket portion;
    a hook portion for hooking a portion of a light string thereon, the hook portion being mounted on the central portion, the hook portion having a pair of opposed hook segments, each of the hook segments having a lateral portion extending from the link section of the central portion and a opposed portion, the lateral portion of the hook segments being oriented substantially parallel to each other, the opposed portions of the hook segments being oriented substantially coaxially in an opposed relationship to each other, wherein the third connector includes a pair of the hook portions; and
    a loop portion being mounted adjacent to the inboard end of the socket portion, the loop portion being mounted at an apex of socket portions.

10. The kit of claim 1 additionally comprising a fourth connector for connecting a pair of support members, a pair of sockets being formed on the fourth connector for receiving an end of the support member, each of the socket portions having a longitudinal axis along which one of the support members is insertable, the longitudinal axes of the sockets being oriented at an angle with respect to each other.

11. The kit of claim 10 wherein the fourth connector comprises:
    a pair of socket portions, each socket portion having one of the sockets formed thereon, each of the socket portions having an inboard end and an outboard end, each socket having an opening located on the outboard end of the respective socket portion; and
    a pair of links linking the inboard ends of the socket portions.

12. The kit of claim 1 wherein each of the socket portions has a plurality of socket-defining walls, each of the socket-defining walls having a contoured edge defining a portion of the socket in the socket portion, a first quantity of the plurality of socket-defining walls being positioned at a first lateral side of the socket and a second quantity of the plurality of socket-defining walls being positioned at a second lateral side of the socket, the socket-defining walls of the first quantity of socket-defining walls being longitudinally offset from the socket-defining walls of the second quantity of socket-defining walls such that the walls of the first and second quantities alternate in a longitudinal direction of the socket.

13. The kit of claim 1, each of the sockets of the first connector having a longitudinal axis along which one of the support members is insertable, wherein the longitudinal axes of the sockets of the first connector are oriented at an angle between approximately 30 degrees and 120 degrees with respect to each other.

14. The kit of claim 1 wherein the central portion of the first connector includes a link section and a saddle section, the saddle section having a reduced width with respect to the link section, the link section of the central portion of the first link connector extending between the inboard ends of the socket portions of the first link connector; and wherein the central portion of the second connector includes a saddle section, the saddle section having a notch for receiving a portion of the saddle section of the central portion of the first connector, the central portion including a link section, the saddle section having a reduced width with respect to the link section, the link section of the central portion of the second link connector extending between the outboard ends of the socket portions of the second link connector.

15. The kit of claim 3 additionally comprising a securing assembly for securing the support members to the connectors, the securing assembly including a first component mounted on each of the connectors and a second component mounted on each end of the base portion of the support member, the first component comprising a first securing arm mounted on each of the connectors adjacent to the sockets of the connector, the first securing arm extending generally in the longitudinal direction of the socket adjacent to the first securing arm, the first securing arm having a first securing barb, the second component comprising a second securing arm mounted on each of the ends of the support member, each of the second securing arms extending in an opposite longitudinal direction of the support member, the second securing member having a second securing barb, the first securing barbs being mounted on the connectors and the second securing barbs being mounted on the support members in a manner such that the first securing barb engages the second securing barb when the support member is inserted in the socket of the connector and resists removal of the support member from the socket from the connector.

16. A connector for connecting a pair of support members, comprising:
    a connector member having a pair of sockets each formed thereon for receiving an end of the support member, each of the sockets having a longitudinal axis along which one of the support members is insertable, the connector member including:
    a central portion; and
    a pair of socket portions, each socket portion having one of the sockets formed thereon, each of the socket portions having an inboard end and an outboard end, the inboard end of each of the socket portions being mounted on the central saddle portion, each socket having an opening located on the outboard end of the respective socket portion;

wherein each of the socket portions has a plurality of socket-defining walls, each of the socket-defining walls having a contoured edge defining a portion of the socket in the socket portion, a first quantity of the plurality of socket-defining walls being positioned at a first lateral side of the socket and a second quantity of the plurality of socket-defining walls being positioned at a second lateral side of the socket, the socket-defining walls of the first quantity of socket-defining walls being longitudinally offset from the socket-defining walls of the second quantity of socket-defining walls such that the walls of the first and second quantities alternate in a longitudinal direction of the socket.

17. The connector of claim 16 wherein the contoured edge of each of the socket-defining walls is generally T-shaped for abutting on side of a support member having a cross-shaped transverse cross section.

18. The connector of claim 16 wherein each quantity of socket-defining walls comprises at least two socket-defining walls.

19. The connector of claim 16 wherein each of the sockets has a longitudinal axis along which one of the support members is insertable, the longitudinal axes of the sockets being oriented at an angle therebetween measuring between approximately 5 degrees and 180 degrees.

20. The connector of claim 16 additionally comprising a securing assembly for securing the connector to a support member having a second component of the securing assembly including a second securing arm with a second barb formed thereon, the securing assembly including a first component mounted on the connector, the first component comprising a first securing arm mounted on the connector adjacent to the socket of the connector, the first securing arm extending generally in a longitudinal direction of the socket, the first securing arm having a first securing barb, wherein the first securing barb is mounted on the first securing arm in a manner such that the first securing barb engages the second securing barb of a support member when the support member is inserted in the socket of the connector and resists removal of the support member from the socket from the connector.

21. A support for supporting a string of lights, comprising:
an elongate base portion having opposite ends; and
a plurality of mounting structures mounted on the base portion, each of the mounting structures comprising a pair of mounting members forming a string-receiving channel therebetween, each of the mounting members having an inner section and an outer section, the outer section being mounted on the inner section, the inner sections of the pair of mounting members being in a spaced and substantially parallel relationship, the outer sections of the pair of mounting members diverging away from each other for guiding a portion of the string of lights into the string-receiving channel.

22. The support of claim 21 wherein a retaining heel is mounted on each of the mounting members at a juncture of the inner and outer sections, the retaining heels of the mounting members of the pair of mounting members being opposed to each other for resisting movement of a portion of a string of lights from the string-receiving channel.

23. The kit of claim 21 wherein the base portion of the support members has a cross-shaped transverse cross section with four lobes, the mounting members extending from one of the lobes.

24. A kit for forming a support for strings of lights, comprising:

a first connector for connecting a pair of support members, a pair of sockets being formed on the first connector for each receiving an end of one of the support members, each of the sockets having a longitudinal axis along which one of the support members is insertable, the longitudinal axes of the sockets being oriented at an angle with respect to each other, the first connector comprising:
a central portion including a link section and a saddle section, the saddle section having a reduced width with respect to the link section, the link section of the central portion of the first link connector extending between the inboard ends of the socket portions of the first link connector;
a pair of socket portions, each socket portion having one of the sockets formed thereon, each of the socket portions having an inboard end and an outboard end, the inboard end of each of the socket portions being mounted on the central saddle portion, each socket having an opening located on the outboard end of the respective socket portion, wherein the inboard end of each of the socket portions has a pair of first saddle faces, each of the first saddle faces of the pair lying in a plane oriented at an angle with respect to each other, an intermediate face being positioned between the pair of first saddle faces;
a hook portion for hooking a portion of a light string thereon, the hook portion being mounted on the central portion, the hook portion having a pair of opposed hook segments, each of the hook segments having a lateral portion extending from the link section of the central portion and a opposed portion, the lateral portion of the hook segments being oriented substantially parallel to each other, the opposed portions of the hook segments being oriented substantially coaxially in an opposed relationship to each other;
a second connector for connecting a pair of support members, a pair of sockets being formed on the second connector for each receiving an end of one of the support members, each of the sockets having a longitudinal axis along which one of the support members is insertable, the longitudinal axes of the sockets being oriented at an angle with respect to each other, the second connector comprising:
a central portion including a saddle section, the saddle section having a notch for receiving a portion of the saddle section of the central portion of the first connector, the central portion including a link section, the saddle section having a reduced width with respect to the link section, the link section of the central portion of the second link connector extending between the outboard ends of the socket portions of the second link connector; and
a pair of socket portions, each socket portion having one of the sockets formed thereon, each of the socket portions having an inboard end and an outboard end, the inboard end of each of the socket portions being mounted on the central saddle portion, each socket having an opening located on the outboard end of the respective socket portion, wherein the inboard end of each of the socket portions has a pair of second saddle faces, each of the second saddle faces of the pair lying in a plane oriented at an angle with respect to each other, an intermediate face being positioned between the pair of second saddle faces;
wherein the first connector is removably mountable on the second connector by slidably engaging the first saddle faces of the first connector with the second saddle faces of the second connector for positioning support members mounted on the first connector in a plane oriented perpendicular to a plane defined by support members mounted on the second connector;

a third connector for connecting a support member thereto, a socket being formed on the third connector for each receiving an end of one of the support members, the socket having a longitudinal axis along which one of the support members is insertable, the third connector comprising:
- a socket portion having a socket formed thereon, the socket portion having an inboard end and an outboard end, the socket having an opening located on the outboard end of the socket portion;
- a hook portion for hooking a portion of a light string thereon, the hook portion being mounted on the central portion, the hook portion having a pair of opposed hook segments, each of the hook segments having a lateral portion extending from the link section of the central portion and a opposed portion, the lateral portion of the hook segments being oriented substantially parallel to each other, the opposed portions of the hook segments being oriented substantially coaxially in an opposed relationship to each other, wherein the third connector includes a pair of the hook portions; and
- a loop portion being mounted adjacent to the inboard end of the socket portion, the loop portion being mounted at an apex of socket portions;

a fourth connector for connecting a pair of support members, a pair of sockets being formed on the fourth connector for each receiving an end of one of the support members, each of the sockets having a longitudinal axis along which one of the support members is insertable, the longitudinal axes of the sockets being oriented at an angle with respect to each other, the fourth connector comprising:
- a pair of socket portions, each socket portion having one of the sockets formed thereon, each of the sockets having an inboard end and an outboard end, each socket having an opening located on the outboard end of the respective socket portion; and
- a pair of links linking the inboard ends of the socket portions;

a support member for supporting a length of a string of lights, the support member comprising:
- an elongate base portion having opposite ends, the base portion having a cross-shaped transverse cross section;
- a plurality of mounting structures mounted on the base portion, each of the mounting structures comprising a pair of mounting members forming a string-receiving channel therebetween, each of the mounting members having an inner section and an outer section, the outer section being mounted on the inner section, the inner sections of the pair of mounting members being in a spaced and substantially parallel relationship, the outer sections of the pair of mounting members diverging away from each other;
- a retaining heel being mounted on each of the mounting members at a juncture of the inner and outer sections, the retaining heels of the mounting members of the pair of mounting members being opposed to each other for resisting movement of a portion of a string of lights from the string-receiving channel;
- wherein all of the plurality of mounting structures extend in a same direction from the base portion;
- wherein all of the plurality of mounting structures lie in a plane;
- wherein the mounting structures are substantially uniformly spaced along a length of the support member; and
- wherein the base portion having a cross-shaped transverse cross section with four lobes, the mounting members extending from one of the lobes; and a securing assembly for securing the support member to the connectors, the securing assembly including a first component mounted on each of the connectors and a second component mounted on the support member, the first component comprising a first securing arm mounted on the connector adjacent to the socket of the connector, the first securing arm extending generally in the longitudinal direction of the socket, the first securing arm having a first securing barb, the second component comprising a second securing arm mounted on an end of the support member, the second securing arm extending in a longitudinal direction of the support member, the second securing member having a second securing barb, the first securing barb being mounted on the connector and the second securing barb being mounted on the support member in a manner such that the first securing barb engages the second securing barb when the support member is inserted in the socket of the connector and resists removal of the support member from the socket from the connector;

wherein each of the socket portions has a plurality of socket-defining walls, each of the socket-defining walls having a contoured edge defining a portion of the socket in the socket portion, a first quantity of the plurality of socket-defining walls being positioned at a first lateral side of the socket and a second quantity of the plurality of socket-defining walls being positioned at a second lateral side of the socket, the socket-defining walls of the first quantity of socket-defining walls being longitudinally offset from the socket-defining walls of the second quantity of socket-defining walls such that the walls of the first and second quantities alternate in a longitudinal direction of the socket.

* * * * *